United States Patent
Roth (10) Patent No.: US 7,753,299 B1
(45) Date of Patent: Jul. 13, 2010

(54) MULTI-STAGE, VARIABLE FORCE APPARATUS AND METHOD FOR GRINDING FOODSTUFFS

(75) Inventor: Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 988 days.

(21) Appl. No.: 11/405,049

(22) Filed: Apr. 17, 2006

Related U.S. Application Data (60) Provisional application No. 60/704,137, filed on Jul. 29, 2005.

(51) Int. Cl.
  *A23K 1/14* (2006.01)
  *A23K 3/00* (2006.01)
  *A47J 17/14* (2006.01)

(52) U.S. Cl. .................. 241/82.5; 241/82.6; 241/84

(58) Field of Classification Search ............... 241/82.5, 241/82.6, 84
See application file for complete search history.

(56) References Cited

U.S. PATENT DOCUMENTS

| | | | |
|---|---|---|---|
| 1,427,719 A | 8/1922 | Bruck | |
| 1,800,149 A | 4/1931 | Miller et al. | |
| 2,579,516 A | 12/1951 | Roubal | |
| 2,906,310 A * | 9/1959 | Schnell | 241/56 |
| 3,586,083 A | 6/1971 | Neuner | |
| 4,108,387 A | 8/1978 | Weiler | |
| 4,479,614 A * | 10/1984 | Bernard | 241/82.2 |
| 4,708,296 A * | 11/1987 | Powers et al. | 241/82.2 |
| 5,597,352 A | 1/1997 | Roth | |
| 6,581,859 B2 * | 6/2003 | Adams et al. | 241/72 |
| 6,644,574 B1 | 11/2003 | Lauber | |
| 7,131,604 B2 * | 11/2006 | Enomura | 239/461 |

FOREIGN PATENT DOCUMENTS

DE  1 167 214  4/1964

* cited by examiner

*Primary Examiner*—Bena Miller
(74) *Attorney, Agent, or Firm*—The Culbertson Group, P.C.; Russell D. Culbertson (57) ABSTRACT

An apparatus includes a drive structure on which are mounted both a first blade carrier and a second blade carrier. The first blade carrier has a first blade facing a cutting surface of a first screen portion, and is mounted on the drive structure so that the first blade is moveable along a first positioning axis with respect to the cutting surface of the first screen portion. The second blade carrier has a second blade facing a cutting surface of a second screen portion, and is mounted on the drive structure so that the second blade is moveable along a second positioning axis with respect to the cutting surface of the second screen portion. A first pressure is used to vary the force with which the first blade presses against the first screen portion and a second fluid pressure is used to vary the force with which the second blade presses against the second screen portion.

20 Claims, 6 Drawing Sheets

MULTI-STAGE, VARIABLE FORCE APPARATUS AND METHOD FOR GRINDING FOODSTUFFS

CROSS-REFERENCE TO RELATED APPLICATION

The Applicant claims the benefit, under 35 U.S.C. §119(e), of U.S. Provisional Patent Application No. 60/704,137 filed Jul. 29, 2005 and entitled "MULTI-STAGE, VARIABLE FORCE APPARATUS AND METHOD FOR GRINDING FOODSTUFFS." The entire content of this provisional patent application is incorporated herein by this reference.

TECHNICAL FIELD OF THE INVENTION

This invention relates generally to comminuting devices. More particularly, the invention relates to a meat comminuting device for maximizing the amount of soft tissue recovery from a feed material while removing hard materials from the feed material.

BACKGROUND OF THE INVENTION

Foodstuff grinders utilize one or more blades and a perforated screen to comminute a feed material, that is, to reduce the size of pieces making up the feed material. The apparatus forces the feed material against the screen with sufficient force to cause portions of the material to enter the screen openings. The blades of the apparatus are driven across the screen openings periodically to cut off that portion of the material having entered the respective screen opening. This relatively small piece of material may then be displaced through the screen opening as the apparatus presses additional feed material against the perforated screen. The severed pieces of material are eventually ejected from an outlet end of the respective screen opening.

Most foodstuff grinders use either a flat plate screen with a substantially planar cutting surface, or a drum-shaped screen having a generally frustoconical inside surface making up the cutting surface. In flat-plate grinders, the blades usually extend generally transversely to an axis extending perpendicularly through a center point of the grinding plate. The transverse extending blades are connected to a drive shaft and pass over the screen openings of the flat plate to provide the desired cutting action as the drive shaft rotates about the perpendicular center axis of the plate. Grinders that have a frustoconical screen employ an auger that rotates about the longitudinal axis of the screen. The outside edge of the auger acts as a blade that passes over the screen openings periodically as the auger rotates.

In addition to grinding or further comminuting a feed material, some grinders are capable of separating out pieces of hard material that are included in the feed material. Pieces of bone, connective tissue, and sinew, are commonly included in a mass of comminuted meat that is to be further ground or sized through a grinding device. Pieces of this type of hard material that are too big to pass through the grinder screen openings are forced into a separate outlet of the grinder. However, small pieces of hard material are commonly chipped off or otherwise separated from larger pieces as the larger pieces are pressed against the grinder screen and as the blades continually move over the screen openings. Some of these chipped or otherwise separated pieces of hard material may be small enough to pass through the screen openings, and thus some pieces of hard material may be included with the meat at the grinding device output. This inclusion of small hard pieces of material in the final comminuted meat product is highly undesirable.

SUMMARY OF THE INVENTION

The present invention includes a comminuting apparatus that overcomes a number of problems associated with prior comminuting devices. In particular, a comminuting apparatus according to the present invention increases soft tissue recovery from the feed material and decreases the amount of hard material in the recovered soft tissue. These benefits are accomplished by using multiple separation stages in the apparatus, with each stage preferably employing a different combination of grinder characteristics. An apparatus according to the invention also preferably includes an arrangement for independently controlling the force of the cutting blades in the different grinder stages.

One preferred apparatus according to the present invention includes a drive structure on which a first blade carrier and a second blade carrier are mounted. The first blade carrier has a first blade facing a cutting surface of a first screen portion, and is mounted on the drive structure so that the first blade is moveable along a first positioning axis with respect to the cutting surface of the first screen portion. The second blade carrier has a second blade facing a cutting surface of a second screen portion, and is mounted on the drive structure so that the second blade is moveable along a second positioning axis with respect to the cutting surface of the second screen portion. A first pressure transfer chamber is defined between the drive structure and a pressure transfer surface of the first blade carrier, and a first pressure communication structure provides pressure communication to the first pressure transfer chamber. A second pressure transfer chamber defined between the drive structure and a pressure transfer surface of the second blade carrier, and a second pressure communication structure provides pressure communication to the second pressure transfer chamber.

This preferred form of the invention provides two different grinding/separating stages in the apparatus which can each have entirely different grinding/separating characteristics. The first one of the stages may employ screen openings that are configured to reject large pieces of hard material and help prevent small fragments of the large pieces from being chipped off as the first blade passes over the screen openings of the first screen portion. The second stage may employ relatively smaller screen openings that are large enough to allow remaining soft tissue to be recovered but small enough to prevent hard material fragments from being separated from larger pieces and passing through the screen with the soft tissue. The hard material pieces, stripped of essentially all soft, useable tissue, are eventually ejected from the apparatus through a separate hard material ejection opening. Numerous variations on this preferred apparatus are possible within the scope of the invention. These variations will be discussed below with reference to the drawings.

The invention also includes methods for grinding foodstuffs, especially meat products, to enhance soft tissue recovery and hard material separation. One preferred method according to the present invention includes applying a first fluid pressure to the pressure transfer surface of the first blade carrier, and applying a second fluid pressure to the pressure transfer surface of the second blade carrier. The first fluid pressure presses the first blade against the cutting surface of the first screen portion, and second fluid pressure presses the second blade against the cutting surface of the second screen portion. The method also includes moving the first blade across the cutting surface of the first screen portion and moving the blade of the second blade carrier across the cutting surface of the second screen portion. According to the invention, the first fluid pressure is isolated from the second fluid pressure sufficiently to enable the two fluid pressures to be dissimilar. This fluid pressure isolation allows the first blade to be pressed against the respective cutting surface with a different force than the pressure with which the second blade presses against its respective cutting surface.

These and other advantages and features of the invention will be apparent from the following description of the preferred embodiments, considered along with the accompanying drawings.

DESCRIPTION OF PREFERRED EMBODIMENTS

The claims at the end of this application set out novel features which the Applicant believes are characteristic of the invention. The various advantages and features of the invention together with preferred modes of use of the invention will best be understood by reference to the following description of illustrative embodiments read in conjunction with the drawings introduced above.

Figure 1A:
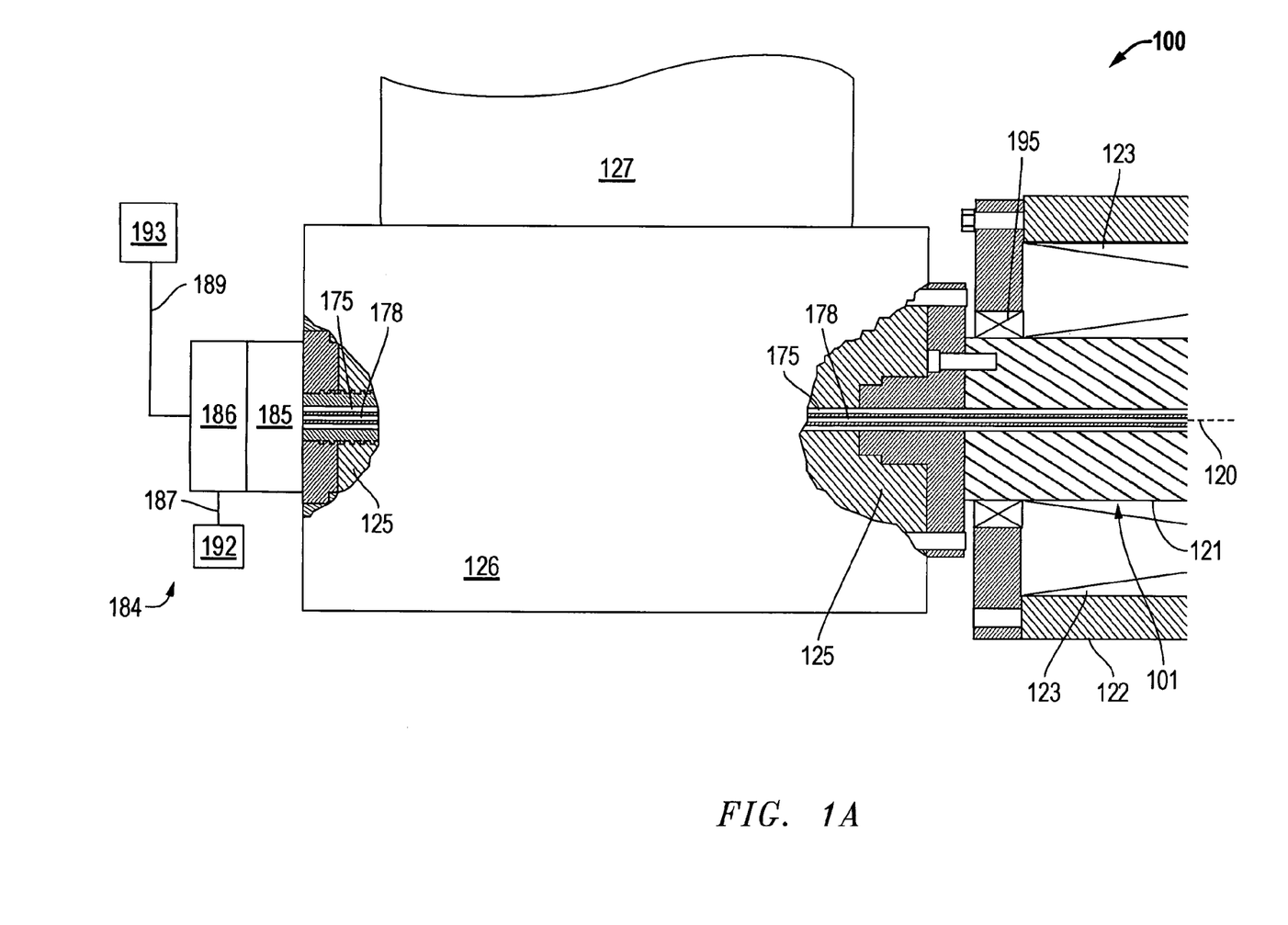
FIG. 1A is a somewhat diagrammatic and partially broken away longitudinal section view taken along a center longitudinal axis of one end of a grinding apparatus embodying the principles of the present invention.
Figure 1B:
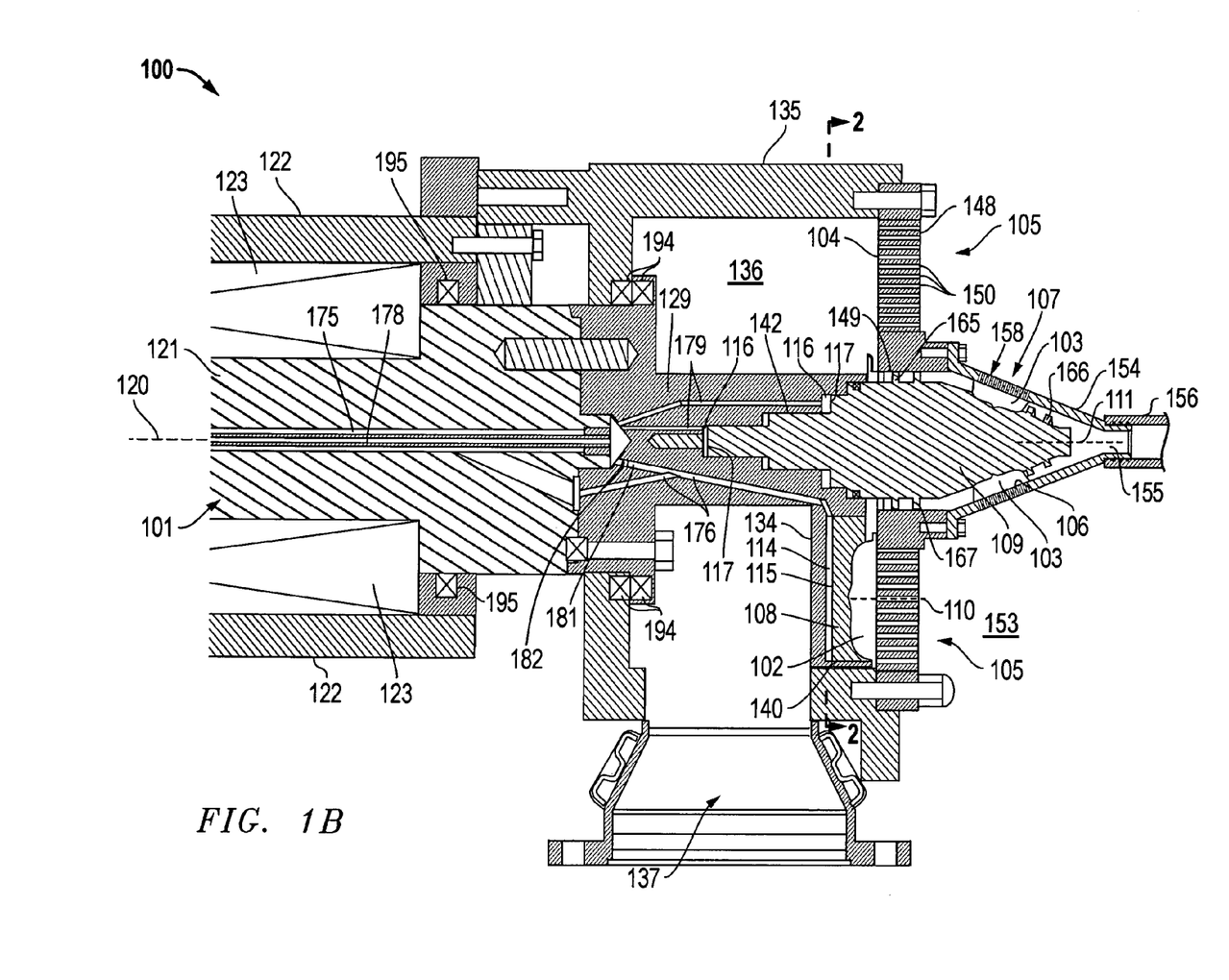
FIG. 1B is a somewhat diagrammatic section view taken along the same plane as FIG. 1A and showing the opposite end of the grinding apparatus shown in FIG. 1A.

FIGS. 1A and 1B together illustrate one preferred apparatus 100 according to the present invention. Apparatus 100 includes a drive structure shown generally at reference numeral 101 that is adapted to drive a first blade 102 and a second blade 103 shown in FIG. 1B. First blade 102 is mounted on a first blade carrier 108 and faces a cutting surface 104 of a first screen portion 105, while second blades 103 are mounted on a second blade carrier 109 and faces a cutting surface 106 of a second screen portion 107. As will be described in further detail below, first blade carrier 108 is movably mounted so that the position of first blade 102 may be varied with respect to cutting surface 104. In particular, first blade carrier 108 is movable along a first positioning axis 110. Second blade carrier 109 is also moveably mounted so as to be movable along positioning axis 111. This movement along axis 111 allows the position of second blade 103 to be varied with respect to cutting surface 106.

Apparatus 100 employs fluid pressure to vary the force with which first blade 102 may be pressed against cutting surface 104 and to vary the force with which second blade 103 may be pressed against cutting surface 106. This fluid pressure for each respective blade is applied through a respective pressure transfer chamber shown in FIG. 1B. In particular, a first pressure transfer chamber 114 is defined between drive structure 101 and a pressure transfer surface 115 of first blade carrier 108. Similarly, a second pressure transfer chamber 116 is defined between drive structure 101 and a pressure transfer surface 117 of second blade carrier 109. A first pressure communication structure provides pressure communication to first pressure transfer chamber 114 and a second pressure communication structure provides pressure communication to second pressure transfer chamber 116. Details of these first and second pressure communication structures will be described further below.

Drive structure 101 shown in both FIGS. 1A and 1B is mounted for rotation about a center longitudinal axis 120. The illustrated drive structure includes a central drive section 121 which is mounted in center housing 122 on a suitable bearing structure shown diagrammatically at reference numeral 123 in FIGS. 1A and 1B. Drive structure 101 also includes a drive end section 125 shown in FIG. 1A which is coupled to a suitable transmission 126 through which a motor 127 may drive the drive structure 101 about longitudinal axis 120. The end of drive structure 101 shown in FIG. 1B includes a working end section 129. It is this working end section 129 that holds the first and second blade carriers, 108 and 109, respectively. In particular, first blade carrier 108 is mounted on a blade carrier arm 134 that extends from working end section 129, and second blade carrier 109 is mounted at the end of the working end section. Working end section 129 extends through a feed chamber housing 135 which partially defines a feed chamber 136 for apparatus 100. An inlet passage 137 is included in feed chamber housing 135 through which feed material may be pumped or otherwise forced into feed chamber 136.

Figure 2:
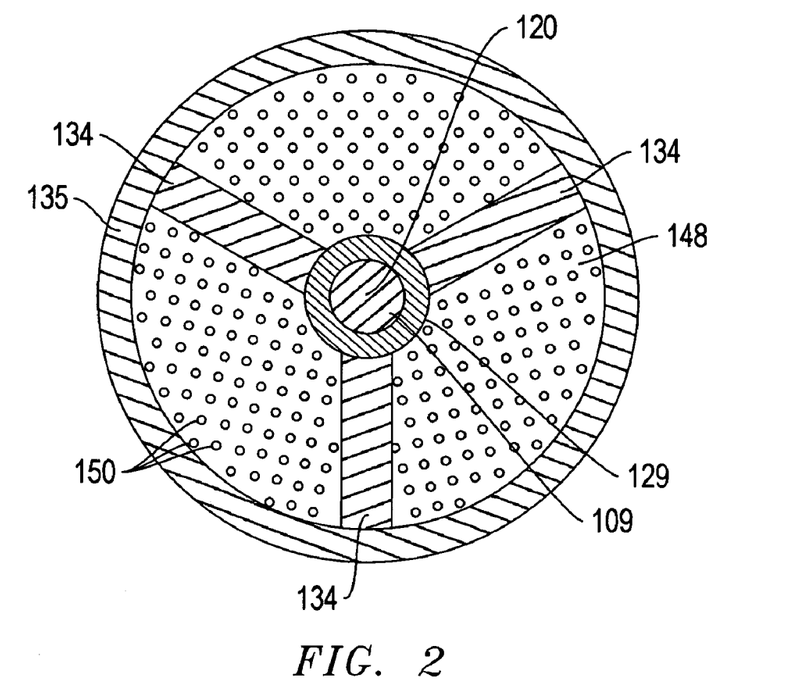
FIG. 2 is a section view taken through apparatus 100 in FIG. 1B along line 2-2 in that figure.

It will be noted that only a single blade carrier arm 134, first blade carrier 108, and first blade 102 are shown in the section view of FIG. 1B. The blade carrier arm 134, first blade carrier 108, and first blade 102 are shown in this particular figure due to the position of the section through the device and the angular orientation of the drive structure 101. Preferred forms of the invention included multiple blade carrier arms 134 as shown in FIG. 2. Each carrier arm 134 carries a respective first blade carrier and first blade. The blade carrier arms 134 may be spaced out at different angular orientations around the central longitudinal axis 120. For example, FIG. 2 shows three separate blade carrier arms 134 spaced apart at 120 degrees to each other. Each carrier arm 134 may extend radially from longitudinal center axis 120 as shown in FIG. 2, or may extend at some angle with respect to a line extending radially from longitudinal center axis 120, or may extend along an axis that is offset from longitudinal axis 120.

Referring again to FIG. 1B, each carrier arm 134 includes a receptacle 140 and the respective first blade carrier 108 is mounted within the receptacle. The respective first pressure transfer chamber 114 is defined by the walls of receptacle 140 and by the pressure transfer surface 115 of the respective first blade carrier 108. In this configuration, the pressure of a fluid contained in first pressure transfer chamber 114 applies a force to pressure transfer surface 115. Discounting frictional losses between walls of receptacle 140 and first blade carrier 108, this fluid pressure force applied to pressure transfer surface 115 determines the force applied by first blade 102 against the first screen portion cutting surface 104.

Second blade carrier 109 is mounted in a receptacle 142 formed in the working end section 129. Second pressure transfer chamber 116 is defined by the walls of receptacle 142 and by pressure transfer surface 117 of second blade carrier 109. It will be noted that the form of the invention shown in FIG. 1B includes a single second blade carrier 109. This is in contrast to the multiple first blade carriers 108 described above with reference to FIG. 2. However, second blade carrier 109 may carry multiple second blades 103. The section view in FIG. 1B shows two second blades 103 spaced apart on opposite sides of center axis 120. A third second blade 103 is preferably included spaced apart from the two second blades shown in FIG. 1B, but is not visible in this section view. It will be appreciated that the invention is not limited to any particular number of second blades 103.

First screen portion 105 in the embodiment of FIG. 1B is formed in a planar plate 148 having a central opening 149 through which second blade carrier 109 extends. A number of screen openings 150 are spaced apart across first screen portion 105, with each screen opening have an inlet end terminating at cutting surface 104 and an outlet end facing to the right in FIG. 1B toward a soft tissue collection area shown generally at reference numeral 153.

Second screen portion 107 in FIG. 1B is formed in a frustoconical housing 154 having its larger diameter end connected to plate 148 about opening 149, and having its smaller diameter end facing away from plate 148, to the right in the orientation of FIG. 1B. This smaller diameter end of frustoconical housing 154 contains a hard material ejection opening 155 connected to a hard material ejection tube 156. The frustoconical second screen portion 107 formed in housing 154 includes a number of screen openings 158. An inlet end of each screen opening 158 faces inwardly and terminates at second cutting surface 106 while an outlet end of each screen opening 158 faces outwardly toward soft tissue collection area 153. It will be noted from FIG. 1B that the illustrated second blade carrier 109 includes auger flights 165 and 166 with blades 103 located there between. Auger flight 165 extends generally in an annular area 167 formed between plate opening 149 and second blade carrier 109 in position to help drive material from feed chamber 136 into frustoconical housing 154 as drive structure 101 is rotated in the desired direction of rotation. Auger flight 166 extends from generally the longitudinal position of second blades 103 toward hard material ejection opening 155 in position to help drive separated hard material toward the ejection opening as drive structure 101 is rotated in the desired direction of rotation.

Figure 3:
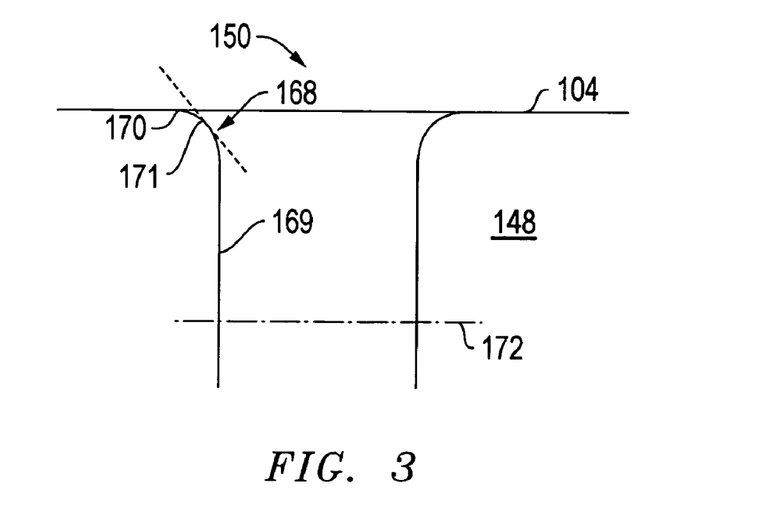
FIG. 3 is a section view of a screen opening for a first screen portion in one preferred form of the invention.

In one preferred form of apparatus 100, different screen opening sizes are used in the first screen portion 105 and second screen portion 107. In particular, openings 150 in first screen portion 105 may be generally cylindrically shaped and have a diameter between approximately 0.250 inch and approximately 0.125 inch. In contrast, screen openings 158 in second screen portion 107 may be substantially smaller in diameter. For example, where the screen openings 150 may be approximately 0.125 inch in diameter, screen openings 158 may be approximately 0.070 inch in diameter. Also, preferred forms of the invention include a hard material deflecting arrangement formed at the inlet end of each first screen opening 150. An example of a suitable hard material deflecting arrangement is shown in the section view of FIG. 3. This illustrated hard material deflecting arrangement comprises a convex curved surface 168 that extends between first screen portion cutting surface 104 and the cylindrical wall 169 of screen opening 150. Where the diameter of screen opening 150 shown in FIG. 3 is 0.125 inch in diameter, convex curved surface 168 may have a continuous radius of 0.0625 inch although other types of continuous and non-continuous curvature are possible within the scope of the present invention. This hard material deflecting arrangement and others are disclosed in U.S. Pat. No. 5,597,352, the entire content of which is incorporated herein by this reference. Although the continuously convex curved surface 168 shown in FIG. 3 is preferred, numerous other alternative hard material deflecting arrangements may be used in an apparatus according to the present invention, including any of the alternative deflection arrangements shown in U.S. Pat. No. 5,597,352. Alternative hard material deflecting arrangements may include an angled surface between cutting surface 104 and cylindrical wall 169 or a combination of an angled surface and a convex curved surface. In any case, the hard material deflecting surface 168 preferably includes at least a portion that extends at an angle of 45 degrees or less to cutting surface 104. As indicated in the example of FIG. 3, the entire portion of the surface defined between point 170 and point 171 extends at an angle of 45 degrees or less to cutting surface 104, based on the tangent lines through points located on the curved surface between point 170 and point 171.

It will be noted that the preferred size of each first screen opening 150 described above refers to the diameter of the opening in a plane extending perpendicular through the cylindrical wall 169 as indicated at line 172. It will also be noted that because screen openings 158 in second screen portion 107 are so small in diameter (e.g. approximately 0.070 inch in diameter, for example), that no hard material deflecting surface arrangement may be necessary for these screen openings. However, forms of the invention may include a respective hard material deflecting surface in both screen openings 150 and screen openings 158. Also, forms of the present invention may include no hard material deflecting surface associated with either screen openings 150 or screen openings 158. Furthermore, it should be noted that the invention is not limited to cylindrical screen openings in either first screen portion 105 or second screen portion 107. Rather, any suitable shape may be used for the screen openings. Also, the size and shape of the screen openings in a given screen portion need not be the same across the entire screen portion.

As indicated above and as will be described in further detail below in connection with the operation of apparatus 100, the comminuting apparatus shown in FIGS. 1A and 1B employs fluid pressure to produce the desired cutting force acting between first and second blades, 102 and 103 respectively, and their respective cutting surface 104 and 106. The form of the invention shown in FIGS. 1A and 1B has a first pressure communication structure that includes an annular passageway 175 extending through both the drive end section 125 and central section 121 of drive structure 101. As shown in FIG. 1B, the first pressure communication structure also includes one or more passageways 176 formed between this annular passageway 175 and each respective first pressure transfer chamber 114 included in apparatus 100. Each passageway 176 includes a portion through central drive section 121 and a portion through working end section 129. Fluid passageways 175 and 176 together define a fluid path to pressure transfer chambers 114. A second pressure communication structure includes a central passageway 178 extending through both the drive end section 125 and central drive section 121. This central passageway 178 connects with a passageway or series of passageways 179 formed in working end section 129 as shown in FIG. 1B. Fluid passageways 178 and 179 together define a fluid path to the respective second pressure transfer chamber 116. The form of apparatus shown in FIG. 1B includes several discrete sections which together make up second pressure transfer chamber 116. The separate sections of second pressure transfer chamber 116 also border on separate sections of pressure transfer surface 117. Each separate section of second pressure transfer chamber 116 may have a separate passageway 179 connecting it to central passageway 178. Any of these passageways 179 may be blocked by a suitable plug. In this way, the total area of pressure transfer surface 117 may be varied. It will also be noted from FIG. 1B that apparatus 100 includes a connecting passageway 181 that may be used to provide fluid communication between the first and second fluid communication structures if desired. However, connecting passageway 181 is shown as being blocked with a suitable plug 182 in FIG. 1B to maintain isolation between the first fluid communication structure and second communication structure.

Fluid pressure may be applied to annular passageway 175 and central passageway 178 by any suitable arrangement. It is possible to pressurize first pressure transfer chamber 114 through passageway 175, and also pressurize second pressure transfer chamber 116 through passageway 178 both to a respective desired operating pressure and then seal the passages while drive structure 101 is rotated in operation of apparatus 100 as described further below. However, preferred forms of the invention include an arrangement by which the pressure in the two passageways 175 and 178, and thus, the pressure in first and second pressure transfer chambers 114 and 116, respectively, may be modified while drive structure 101 is rotating about central longitudinal axis 120. A suitable dual channel rotary union may be used to accommodate this adjustability of pressure while the device is operated. Such a rotary union is shown diagrammatically at 184 in FIG. 1A. The diagrammatically illustrated rotary union 184 includes a first component 185 and a second component 186. First component 185 is adapted to rotate with the drive end section 125 as drive structure 101 rotates about axis 120. Second component 186 remains stationary as drive end section 125 rotates. A first input line 187 provides a first input to rotary union 184, and a second input line 189 provides a second input to the rotary union. The fluid pressure applied through first input line 187 passes through a rotating seal arrangement in rotary union 184 and is ultimately applied to annular passageway 175. Similarly, fluid pressure applied through second input line 189 passes through the rotating seal arrangement of rotary union 184 and is ultimately applied to central passageway 178. Each input line 187 and 189 is connected to a respective fluid pressure source 192 and 193. By using two separate fluid pressure sources and isolating the two fluid pressures in the various passages through drive structure 101, the cutting action provided by first blades 102 may be controlled entirely independently of the cutting action provided by second blades 103. The invention is not limited to any particular type of fluids for applying the desired pressures. For example, a suitable hydraulic fluid may be used in either stage. Alternatively, air or another gas may be used as to apply the desired pressure. Any suitable fluid pressure sources may be used for sources 192 and 193 as appropriate for the given type of pressurizing fluid.

It will be appreciated that FIGS. 1A and 1B are simplified greatly in order to clearly show the various components of the present invention without obscuring the invention in unnecessary detail. FIGS. 4, 5A, and 5B described below are similarly simplified. In FIGS. 1A and 1B for example, center housing 122, the housing for transmission 126, an feed chamber housing 135 will commonly be supported on a common support structure/frame and this common support structure/frame is omitted from the figures. Another example of a simplification in the drawings includes the bearing structure 123. Also, numerous rotating seals are required in the apparatus and these rotating seals are also shown diagrammatically. For example, rotating seal 194 helps isolate the feed material chamber 136 while still allowing drive structure 101 to rotate with respect to feed chamber housing 135. Rotating seals 195 help isolate bearing structure 123 and the lubricants that may be associated with the bearing structure. Also, since many different types of fluid pressure sources and rotary unions may be used in apparatus 100, those elements are likewise shown diagrammatically. Additionally, those skilled in art of foodstuff comminuting devices in general will appreciate that the various housings or members shown as one-piece elements in the figures may in fact be made up of multiple components that are connected together to form the housing or member.

Further variations in apparatus 100 may be included within the scope of the invention. For example, although blades 102 or 103 are shown mounted on the respective blade carrier 108 or 109 so that the line of the respective blade edge may rock slightly from one end to the other, other forms of the invention may mount the blades so that they cannot rock in this fashion. Also, although the blades 102 and 103 and their respective and blade carriers 108 and 109 are shown as separate components, a given blade and its respective blade carrier may be integrally formed within the scope of the present invention. Furthermore, some forms of the invention may include an integrated arrangement for pumping feed material into feed chamber 136 rather than relying on a separate pumping device. For example, rather than having feed material pumped into feed chamber 136 through feed inlet passage 137 as shown in FIG. 1B, feed material may be pumped into feed chamber 136 with one or more auger flights associated with drive structure 101.

It should also be noted that the invention is not limited to any particular materials for the various components included in apparatus 100. Most components of apparatus 100 that may come in contact with the feed material are preferably made from a suitable food handling grade stainless steel. Other components may be made from any other suitable material such as steel or other metal or metal alloy. Also, food handling grade plastics may be used for certain components in apparatus 100.

In operation of apparatus 100, feed material (not shown) is pumped or otherwise forced into feed chamber 136 through feed inlet opening 137. The force necessary to displace feed material through opening 137 and on through apparatus 100 may be applied by any pumping device suitable for use with the respective feed material. Preferred pumping devices for use with apparatus 100 include positive displacement pumps and auger-type pumps among others. The feed material forced into feed chamber 136 is ultimately forced first against cutting surface 104 of first screen portion 105 and then against cutting surface 106 of second screen portion 107. Simultaneously with supplying the feed material, drive structure 101 is rotated about its longitudinal axis 120. This rotation drives each first blade 102 across cutting surface 104 and each second blade 103 across cutting surface 106. As the feed material is pressed by the pumping force against cutting surface 104, soft tissue in the feed material presses into screen openings 150 through first screen portion 105. When a respective first blade 102 then passes over cutting surface 104, the blade cuts the feed material generally at the plane of the cutting surface to separate the part of the soft tissue that had entered the respective screen opening 150. As the pumping force continues to force feed material up against cutting surface 104, more soft tissue enters the screen openings 150, displacing the previously severed portions further through the respective screen opening. This process of forcing further feed material against cutting surface 104 and periodically severing portions of material pressed into the screen openings continues so that the severed pieces ultimately pass entirely through the respective screen opening 150 and exit from apparatus 100 into soft tissue collection area 153.

Pieces of hard material in the feed that are larger than screen openings 150 are generally unable to enter the screen openings and are ultimately forced inwardly to annular passage 167 together with any soft tissue that did not exit apparatus 100 through first screen openings 150. The hard material may include bone pieces, gristle, cartilage, and heavy sinu where the feed material comprises a comminuted meat product. It will be noted that the hard material deflecting surfaces 168 preferably associated with the inlet end of each screen opening 150, as shown in FIG. 3, helps prevent bone fragments from being chipped off larger pieces of bone that may be present in the feed material, and thus helps exclude any of the hard material from exiting feed chamber 136 through screen openings 150. Even in embodiments of the invention that include no deflecting surfaces 168, screen openings 150 may be sized so that most of the hard material that may be present in the feed material passes across cutting surface 104 and does not pass through screen openings 150 along with the soft tissue, but rather continues on to annular passage 167.

The pressure applied to meat products in feed chamber 136 together with the pressure applied by auger flight 165 in annular passage 167 forces the hard material and any remaining soft tissue into frustoconical housing 154 and against the preferred, relatively smaller screen openings 158 in second screen portion 107. This pressure helps force the remaining soft tissue into screen openings 158 where blades 103 acting against cutting surface 106 may sever the material and allow severed soft tissue to pass on through the screen openings and exit apparatus 100 into soft tissue collection area 153. Since the bulk of the soft tissue originally included in the feed material has already been removed from the apparatus through screen openings 150, screen openings 158 may be substantially smaller in cross-section than screen openings 150. In some preferred forms of apparatus 100, second screen openings 158 may be small enough in diameter, approximately 0.070 inch for example, so as to entirely exclude all pieces of hard material, allowing only soft tissue to pass there through. The remaining hard material continues to pass through frustoconical housing 154 to the right in FIG. 1B under the feed material pressure and the added force applied by auger flights 165 and 166, and eventually exits the housing through hard material ejection opening 155. The hard material is ultimately displaced through tube 156 and is collected in an area separate from soft tissue collection area 153.

The form of the invention shown in FIG. 1B allows the force applied between first blades 102 and first cutting surface 104 to be controlled entirely independently of the force applied between second blades 103 and second cutting surface 106. Also, this cutting force in both cases may be adjusted while apparatus 100 is operating. Thus, the cutting action provided by first blades 102 and second blades 103 may be tuned to provide the desired soft tissue output from a given feed material. Furthermore, adjustments may be made in the cutting action provided by first blades 102 and second blades 103 to account for changes in feed material and to account for blade and/or screen wear over time.

Figure 4:
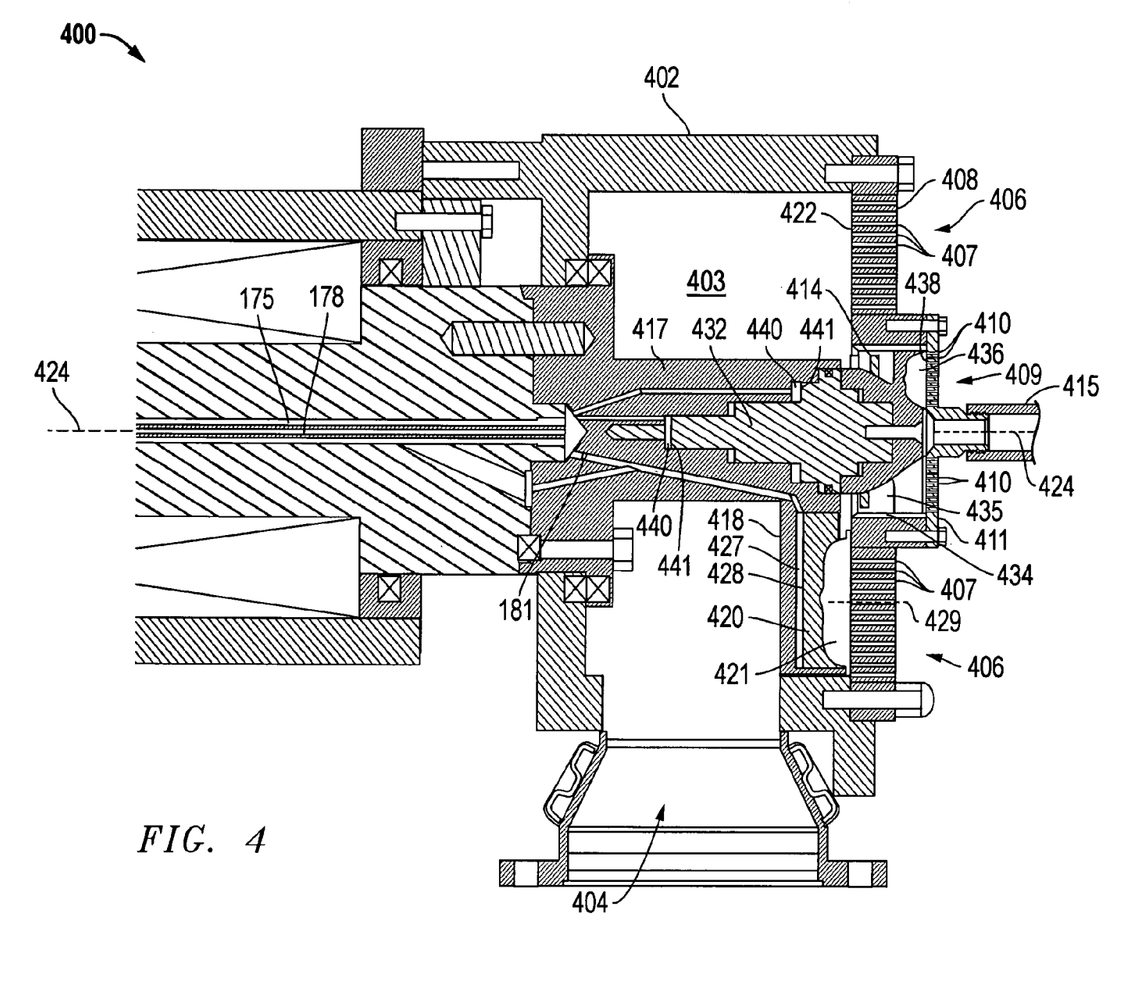
FIG. 4 is a somewhat diagrammatic longitudinal section view taken along a center longitudinal axis of one end of an alternate form of grinding apparatus according to the present invention.

FIG. 4 shows a portion of another comminuting apparatus within the scope of the present invention. FIG. 4 shows only the working end of apparatus 400 including the feed material handling section and grinding/comminuting components. It will be appreciated that apparatus 400 may include a drive structure similar to drive structure 101 shown in FIG. 1A, a transmission and drive motor arrangement also similar to that shown in FIG. 1A. Apparatus 400 may also include a fluid pressure communication structure similar to that shown in FIG. 1A and fluid pressure sources similar to the sources 192 and 193 shown in FIG. 1A, together with a suitable rotary union for communicating the required fluid pressure to the working end of the apparatus. Since all this structure may be similar to that shown in FIG. 1A, this drive end section structure is omitted from FIG. 4.

The form of the invention shown in FIG. 4 includes a feed housing 402, defining a feed chamber 403 with a feed material inlet opening 404. A first screen portion 406 of apparatus 400 includes screen openings 407 formed through a planar plate 408. A second screen portion 409 includes screen openings 410 formed through a second planar plate 411. Second plate 411 includes a center opening 414 through which hard material may be ejected from apparatus 400 and ultimately displaced through hard material ejection tube 415.

Apparatus 400 also includes a working end section 417 similar to the working in section 129 shown in FIG. 1B. A carrier arm 418 extends from working end section 417 and a first blade carrier 420 is movably mounted on the carrier arm. First blade carrier 420 supports a first blade 421 facing a cutting surface 422 of first screen portion 406. As with apparatus 100, apparatus 400 preferably includes two or more first carrier arms 418 extending from working end section 417 at different angular orientations about drive structure axis 424, each respective carrier arm having a separate first blade carrier 420 and first blade 421 positioned to face cutting surface 422. A respective pressure transfer chamber 427 is defined between each blade carrier 420 and its respective carrier arm 418 with a pressure transfer surface 428 of the blade carrier forming one boundary of the respective pressure transfer chamber. In this configuration, each first blade carrier 420 along with its respective first blade 421 is movable along a blade positioning axis 429 so that the position of the blade may be adjusted relative to cutting surface 422, as may the force applied between the blade and the cutting surface.

Apparatus 400 also includes a second blade carrier 432 which is mounted at the end of working end section 417 so as to be movable along second positioning axis that corresponds to drive structure axis 424. Second blade carrier 432 extends through a central opening 434 in plate 408, leaving an annular space 435. Second blades 436 are mounted on second blade carrier 432 so as to face a cutting surface 438 of second screen portion 409. The fluid pressure applied from a second pressure transfer chamber 440 to pressure transfer surface 441 of second blade carrier 432 determines the force with which second blades 436 press against second cutting surface 438. The embodiment shown in FIG. 4 includes multiple sections of second pressure transfer chamber 440, each separate section being associated with a respective pressure transfer surface 441.

Apparatus 400 shown in FIG. 4 operates similarly to apparatus 100 shown in FIG. 1B. It will be noted, however, that both the first screen portion 406 and second screen portion 409 in apparatus 400 are flat plate-type screens in contrast to the arrangement in FIG. 1B in which the second screen portion 107 comprises a frustoconically shaped screen. Despite this difference between the second screen type used in apparatus 100 and the second screen type used in apparatus 400, screen openings 410 used in second screen portion 409 are preferably sized similarly to those used in screen portion 107 in FIG. 1B. Also, screen openings 407 in first screen portion 406 are also sized similarly to the openings 150 in the first screen portion 105 shown in FIG. 1B. In this preferred relationship of relatively larger screen openings in the first screen portion 406, the bulk of soft tissue in a feed material for apparatus 400 is forced through screen openings 407, and screen openings 410 recover small portions of soft tissue remaining with hard material that was unable to pass through screen openings 407. Screen openings 407 may include hard material deflecting surfaces similar to surface 168 shown in FIG. 1B to help prevent hard material pieces from being chipped off and then passing through the first screen openings with soft tissue. Regardless of whether hard material deflecting surfaces are used with the various screen openings 407 and 410, remaining hard material exits apparatus 400 through opening 414 and through hard material ejection tube 415 to be collected in a separate hard material collection area. The force with which first blades 421 press against cutting surface 422 may be adjusted by adjusting the pressure applied to first pressure transfer chamber 427 and the force with which second blades 436 press against cutting surface 438 may be adjusted by adjusting the pressure applied to second pressure transfer chamber(s) 440.

Figure 5A:
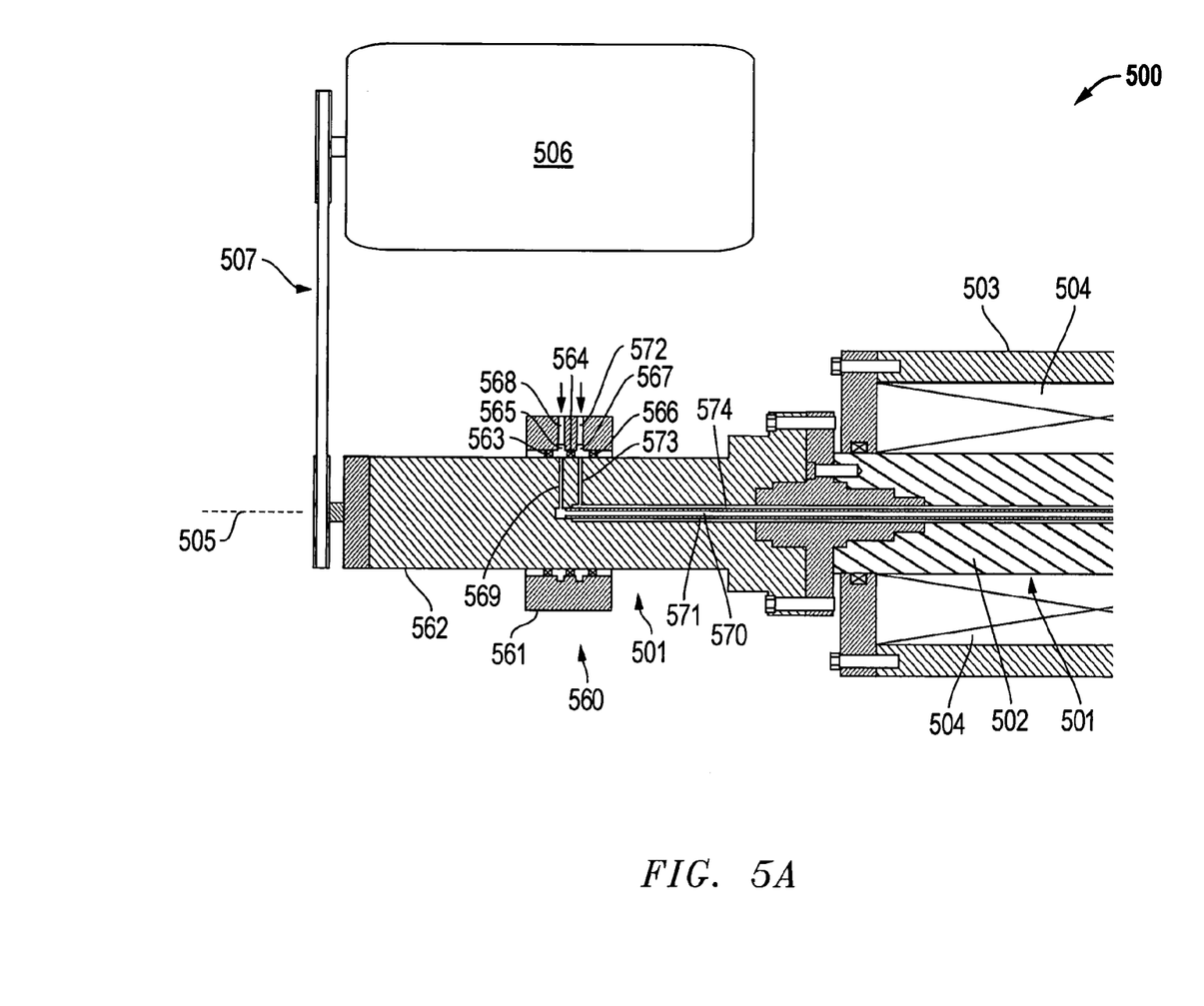
FIG. 5A is a somewhat diagrammatic and partially broken away longitudinal section view taken along a center longitudinal axis of one end of yet another alternate form of grinding apparatus according to the present invention.
Figure 5B:
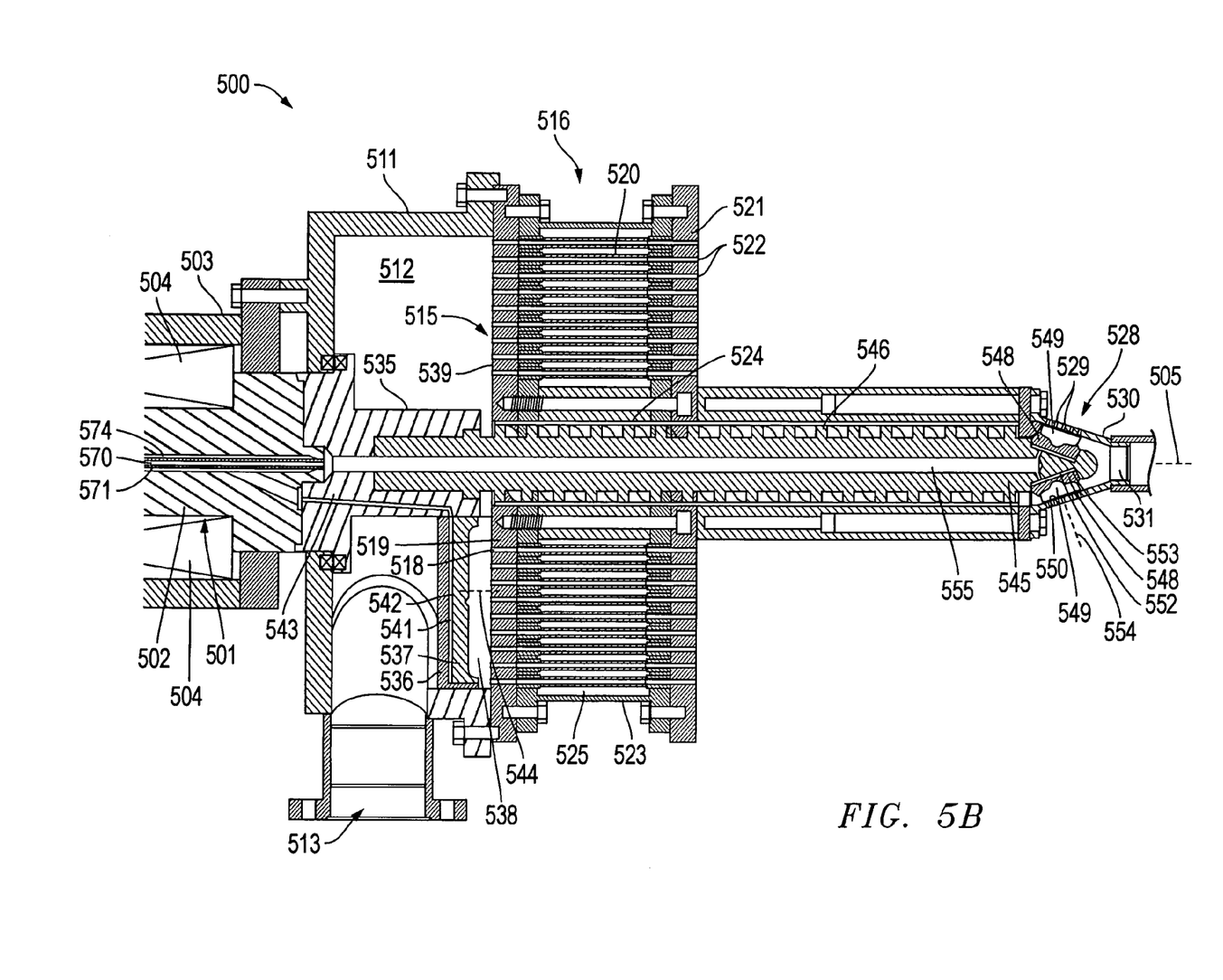
FIG. 5B is a somewhat diagrammatic section view taken along the same plane as FIG. 5A and showing the opposite end of the grinding apparatus shown in FIG. 5A.

FIGS. 5A and 5B together show yet another apparatus within the scope of the present invention. Apparatus 500 includes a drive structure 501 similar to drive structure 101 shown in FIGS. 1A and 1B. Drive structure 501 includes a central drive section 502 supported in a central housing 503 on a suitable bearing structure 504 for rotation about a longitudinal axis 505. Unlike the gearbox drive arrangement shown in FIG. 1A, apparatus 500 is driven by motor 506 through a belt or chain drive arrangement shown generally at 507 in FIG. 5A.

As shown in FIG. 5B, apparatus 500 also includes a feed material housing 511 defining a feed material chamber 512 with a feed material input opening 513. Unlike the first screen portion included in apparatus 100 and apparatus 400 (screen portion 105 in FIG. 1B and screen portion 406 in FIG. 4), the first screen portion 515 of apparatus 500 is associated with a sparging arrangement shown generally at reference numeral 516. First screen portion 515 is made up of a number of screen openings 518 formed through plate 519. However, rather than opening directly to a soft material collection area, each screen opening 518 aligns with a sparging tube 520. An end plate 521 of sparging arrangement 516 also includes openings 522, each aligned with a respective one of the sparging tubes 520. A sparger housing 523 surrounds the sparging tubes 520 and, together with central tube 524 and plates 519 and 521, forms a sparging chamber 525. This sparging arrangement 516 is similar to the arrangement disclosed in U.S. patent application publication No. 2004-0071822 published Apr. 15, 2004. The entire content of this published patent application is incorporated herein by this reference. A fluid may be pumped or otherwise forced into sparging chamber 525 and is then applied to the material passing through tubes 520 and central tube 524 through openings in the tubes or porous and permeable sections in the tubes.

Apparatus 500 includes a second screen portion 528 at the far right in FIG. 5B, made up of a number of second screen openings 529 formed through a frustoconical housing 530. The narrower end of frustoconical housing 530 includes a hard material ejection opening 531 similar to the ejection opening 155 shown in FIG. 1B.

Similar to the devices shown in FIGS. 1B and 4, apparatus 500 includes a working end section 535 extending through feed material chamber 512. A carrier arm 536 extends from this working end section 535 and a first blade carrier 537 is movably mounted on the carrier arm with a first blade 538 facing a cutting surface 539 of first screen portion 515. As in the previously described embodiments, apparatus 500 preferably includes two or more such carrier arms 536, each extending at a different angular orientation about longitudinal axis 505, and each with a respective blade carrier and blade combination. Also, similarly to the previously described embodiments, a first pressure transfer chamber 541 is defined between carrier arm 536 and first blade carrier 537 with a pressure transfer surface 542 of the blade carrier forming a boundary of first pressure transfer chamber 541. A first fluid communication structure through drive structure 501 includes fluid passages 543 to allow fluid pressure in pressure transfer chamber 541 to be adjusted as described with reference to FIG. 1B. This allows the position of first blade carrier 537 and first blade 538 to be varied along positioning axis 544.

In order to accommodate the width of sparging arrangement 516, drive structure 501 includes a drive structure extension 545 extending through central tube 524 of the sparging arrangement. Central tube 524 may be formed from a porous and permeable material or includes small transverse openings to allow a fluid to be sparged in to the material driven through the central tube. This pressure for driving material through central tube 524 is applied to feed material chamber 512 from an external pump connected to inlet 513 with additional pressure being created by auger flight 546 on drive structure extension 545 as the drive structure extension is rotated appropriately about central axis 505 together with the rest of drive structure 501.

Although apparatus 500 utilizes a frustoconical second screen portion 528 similar to the second screen portion 107 shown in apparatus 100 in FIG. 1B, the apparatus shown in FIG. 5B includes a somewhat different arrangement of second blade carriers and second blades. In particular, apparatus 500 includes multiple second blade carriers 548, each having a second blade 549 facing a cutting surface 550 of the frustoconical second screen portion 528. This is in contrast to the single second blade carrier structure 109 which carries multiple second blades 103 in the apparatus shown in FIG. 1B. Unlike the arrangement for the second blades 103 shown in FIG. 1B, each second blade carrier 548 shown in FIG. 5B is individually movably mounted at the right end of drive structure extension 545 with a respective pressure transfer chamber 552 formed between the shaft extension and the second blade carrier 548, and with a separate pressure transfer surface 553 for each second blade carrier 548. Each second blade carrier 548 and second blade 549 is movable along a respective second positioning axis 554. A second pressure communication structure includes passages 555 that allow the pressure in pressure transfer chambers 552 to be varied to vary the force with which each second blade 549 presses against second cutting surface 550.

Referring to the drive end of apparatus 500 shown in FIG. 5A, it will be noted that the apparatus employs a somewhat different arrangement for applying the desired fluid pressure to the first and second pressure communication structures. Rather than the rotary union 184 shown in FIG. 1A, apparatus 500 includes a rotary seal arrangement shown generally at 560 in FIG. 5A. Rotary seal arrangement 560 includes a housing 561 that extends around a section 562 of drive structure 501. Rotating seals 563 and 564 cooperate to isolate an annular area 565 between housing 561 and drive structure section 562. Rotating seal 564 also cooperates with rotating seal 566 to isolate an annular area 567 between housing 561 and drive structure section 562. An input fluid passage 568 is formed in housing 561 to provide fluid pressure from a pressure source (not shown in FIG. 5A) to annular area 565. The fluid pressure in annular area 565 is communicated via fluid passage (inlet port) 569 to a central fluid pressure passageway 570 through drive structure 501. This central passageway 570 is formed through tube 571 and corresponds to passageway 178 shown in FIGS. 1A and 1B. An input fluid passage 572 is formed in housing 561 to provide fluid pressure from another pressure source (not shown in FIG. 5A) to annular area 567. The fluid pressure applied to annular area 567 is communicated via fluid passage (inlet port) 573 to an annular fluid passageway 574 through drive structure 501. This annular passageway 574 corresponds to annular passageway 175 shown in FIGS. 1A and 1B. The fluid pressure applied through input fluid passage 568 ultimately supplies the pressure to second pressure transfer chambers 552 shown in FIG. 5B, and the fluid pressure applied through input fluid passage 572 as shown in FIG. 5A ultimately supplies the pressure to first pressure transfer chambers 541 as shown in FIG. 5B.

The operation of apparatus 500 with respect to comminuting the feed material and separating hard material pieces from soft tissue in the feed material is similar to that described above with reference to apparatus 100 in FIGS. 1A and 1B. However, apparatus 500 also allows a desired material to be sparged in to the soft tissue through sparging tubes 520 and through the central tube 524. This arrangement provides all of the benefits of the apparatus shown in FIGS. 1A, 1B, and 4 plus sparging capability in a very compact space.

The above described preferred embodiments are intended to illustrate the principles of the invention, but not to limit the scope of the invention. Various other embodiments and modifications to these preferred embodiments may be made by those skilled in the art without departing from the scope of the present invention. For example, although all of the embodiments of the invention shown in the figures include an arrangement for adjusting the blade pressure for both sets of screens included in the respective device, other forms of the invention may include one comminuting screen having a fixed blade and another comminuting screen that cooperates with a blade that is associated with a blade pressure adjustment arrangement similar to that shown for first blade 102 or second blade 103 shown in FIG. 1B. Other forms of the invention may include a single blade carrier with first blades facing a first cutting surface of a first screen and with second blades facing a second cutting surface of a second screen. Also, the invention is not limited to two different comminuting screens such as screen portions 105 and 107 shown in FIG. 1B. Rather, devices within the scope of the invention may include more than three comminuting screens.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, August 2001 as revised May 2004), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. An apparatus including:
    (a) a drive structure supported for rotation about a drive axis;
    (b) a first blade carrier having a first blade facing a cutting surface of a first screen portion, the first blade carrier being moveably mounted on the drive structure along a first positioning axis to vary the position of the first blade with respect to the cutting surface of the first screen portion, the first blade carrier also being mounted in the apparatus so as to sweep the first blade across the first screen portion cutting surface when the drive structure rotates about the drive axis;
    (c) a first pressure transfer chamber defined between the drive structure and a pressure transfer surface of the first blade carrier;
    (d) a first pressure communication structure providing pressure communication to the first pressure transfer chamber, the first pressure communication structure including a first passageway extending longitudinally along a portion of the drive structure;
    (e) a second blade carrier having a second blade facing a cutting surface of a second screen portion, the second blade carrier being moveably mounted on the drive structure along a second positioning axis to vary the position of the second blade with respect to the cutting surface of the second screen portion, the second blade carrier also being mounted in the apparatus so as to sweep the second blade across the second screen portion cutting surface when the drive structure rotates about the drive axis;
    (f) a second pressure transfer chamber defined between the drive structure and a pressure transfer surface of the second blade carrier; and
    (g) a second pressure communication structure providing pressure communication to the second pressure transfer chamber, the second pressure communication structure including a second passageway extending longitudinally along a portion of the drive structure.

2. The apparatus of claim 1 wherein the second blade carrier is mounted at one end of the drive structure and is intersected by the drive axis.

3. The apparatus of claim 1 wherein the first pressure communication structure and the second pressure communication structure are isolated from each other to prevent fluid communication there between.

4. The apparatus of claim 1 wherein the first screen portion includes screen openings of at least a first cross-sectional size and the second screen portion includes screen openings having a cross-sectional size less than the first cross-sectional size, and wherein the apparatus further includes a passage extending from an inlet side of a structure in which the first screen portion is formed to an area defined by an inlet side of the second screen portion, the passage being separate from the screen openings of the first screen portion.

5. The apparatus of claim 4 wherein the screen openings of the first screen portion have a convex curved surface facing the first blade.

6. The apparatus of claim 1 wherein the drive structure includes:
    (a) a first receptacle in which the first blade carrier is moveably received; and
    (b) a second receptacle in which the second blade carrier is moveably received.

7. The apparatus of claim 2 wherein the second blade carrier carries more than one blade and the cutting surface of the second screen portion is frustoconical.

8. The apparatus of claim 1 further including:
    (a) a first pneumatic pressure source or a first hydraulic pressure source operatively connected to the first pressure communication structure; and
    (b) a second pneumatic pressure source or a second hydraulic pressure source operatively connected to the second pressure communication structure.

9. A meat comminuting apparatus including:
(a) a first blade carrier having a first blade and being movable along a first blade positioning axis with respect to a first screen portion in position to press the first blade against the first screen portion in response to a first fluid pressure applied to the first blade carrier;
(b) a second blade carrier having a second blade and being movable along a second blade positioning axis with respect to a second screen portion in position to press the second blade against the second screen portion in response to a second fluid pressure applied to the second blade carrier, the first and second fluid pressures being independently controllable; and
(c) a drive structure, the drive structure being mounted for rotation about a drive axis to drive the first blade carrier so that the first blade passes over the first screen portion and for driving the second blade carrier so that the second blade passes over the second screen portion.

10. The apparatus of claim 9 wherein both the first blade carrier and the second blade carrier are moveably mounted on the drive structure, and wherein the second blade carrier is mounted at an end of the drive structure and is intersected by the drive axis.

11. The apparatus of claim 9 wherein the drive structure includes:
(a) a first receptacle in which the first blade carrier is moveably received; and
(b) a second receptacle in which the second blade carrier is moveably received.

12. The apparatus of claim 9 further including:
(a) a first fluid path extending from a first inlet port on the drive structure to a first pressure transfer chamber defined partially by a pressure transfer surface of the first blade carrier; and
(b) a second fluid path extending from a second inlet port on the drive structure to a second pressure transfer chamber defined partially by a pressure transfer surface of the second blade carrier.

13. The apparatus of claim 12 further including:
(a) a first pneumatic pressure source or a first hydraulic pressure source operatively connected to the first inlet port; and
(b) a second pneumatic pressure source or a second hydraulic pressure source operatively connected to the second inlet port.

14. The apparatus of claim 10 wherein:
(a) a cutting surface of the first screen portion is substantially planar; and
(b) a cutting surface of the second screen portion is frustoconical.

15. The apparatus of claim 11 wherein the first screen portion includes screen openings having a convex curved surface facing the first blade.

16. The apparatus of claim 9 wherein the first screen portion includes screen openings having at least a first cross-sectional size and the second screen portion includes screen openings having a cross-sectional size less than the first cross-sectional size, and wherein the apparatus further includes a passage extending from an inlet side of a structure in which the first screen portion is formed to an area defined by an inlet side of the second screen portion, the passage being separate from the screen openings of the first screen portion.

17. A method including:
(a) applying a first fluid pressure to a pressure transfer surface of a first blade carrier, the first blade carrier having a blade which presses against a cutting surface of a first screen portion in response to the first fluid pressure applied to the pressure transfer surface of the first blade carrier;
(b) applying a second fluid pressure to a pressure transfer surface of a second blade carrier, the second blade carrier having a blade which presses against a cutting surface of a second screen portion in response to the second fluid pressure;
(c) isolating the first fluid pressure from the second fluid pressure sufficiently to enable the first fluid pressure and second fluid pressure to be dissimilar; and
(d) moving the blade of the first blade carrier across the cutting surface of the first screen portion and moving the blade of the second blade carrier across the cutting surface of the second screen portion.

18. The method of claim 17 further including the step of changing the first fluid or the second fluid pressure while the blade of the first blade carrier and the blade of the second blade carrier are moving across the respective cutting surface.

19. The method of claim 17 further including the step of applying the first fluid pressure and the second fluid pressure via a respective fluid path formed within a shaft used to move the respective blade carrier with respect to the respective cutting surface.

20. The method of claim 17 further including the step of applying the first fluid pressure from a first pressure source, and applying the second fluid pressure from a second pressure source independently controllable of the first pressure source.

* * * * *